United States Patent Office 3,704,106
Patented Nov. 28, 1972

3,704,106
COLORED PETROLEUM DISTILLATE
Richard B. Orelup, Paterson, N.J., assignor to Morton International, Inc., Chicago, Ill.
No Drawing. Original application Oct. 24, 1967, Ser. No. 677,733. Divided and this application Mar. 23, 1970, Ser. No. 22,066
Int. Cl. C10l 1/22
U.S. Cl. 44—59
4 Claims

ABSTRACT OF THE DISCLOSURE

A petroleum distillate is imparted with a distinct colorization by a liquid azo dye composition soluble in the distillate. The liquid azo dye composition is characterized in that it
(a) has a color value which is at least about forty percent of the color value of a comparable solid dye;
(b) exhibits permanently homogeneous liquidity;
(c) is capable of complete and substantially instantaneous solubility in petroleum distillates; and
(d) essentially consists of between about 50–75% by weight of a mixture of azo dyes containing $C_5$–$C_{12}$ alkyl beta-naphthols or p-$C_5$–$C_{12}$ alkyl phenol in the dye molecule and about between 50–25% by weight of a liquid organic viscosity depressant compatible with the azo dyes.

CROSS-REFERENCE TO PRIOR APPLICATION

This is a division of application Ser. No. 677,733, filed Oct. 24, 1967, and now abandoned.

FIELD OF INVENTION

The invention relates to petroleum distillates which are colored by novel liquid azo dye compositions.

While the liquid azo dye compositions have a wide field of application and may successfully be used, for example, in ink manufacture, the coloring of synthetic plastic materials, wood staining and the like, they are particularly useful as additives to liquid petroleum distillates and products. The invention will, therefore, in the following be explained primarily in connection with the coloring of petroleum products such as gasoline, lubricating oils and the like petroleum distillates.

BACKGROUND INFORMATION AND PRIOR ART

It is common practice to color many petroleum products for identification and other purposes. The dyes customarily used are supplied in solid physical form, to wit, either as powders or in a variety of agglomerated states such as granules, flakes or beads. The latter are intended to overcome the disadvantages of powdered dye, which tends to dust, making handling objectionable, and to cake, which interferes with operation of modern equipment for dye application. However, the solubility rate of most agglomerated dye forms is considerably less than that of powdered dye, which restricts their use in many applications.

All customarily used dyes have relatively low solubilities in organic solvents, regardless of their solid form. For example, a 5% solubility in organic solvents is considered extremely high, while most dyes have a solubility considerably lower than 2%. Such solubilities have seriously limited the application of these dyes as previously prepared solutions because of high added solvent cost, and expensive equipment requirements.

Serious but unsuccessful attempts have been made to supply azo dye compositions in concentrated liquid form. More recently, it has been suggested to prepare a pourable dye paste concentrate. Although such paste concentrates constitute a significant improvement in this art, the distribution of a paste in a large volume of liquid is still more difficult than the preparation of an intimate mixture between two liquids.

SUMMARY OF THE INVENTION

Accordingly, it is a primary object of this invention to provide colored petroleum distillates that are colored by a liquid azo dye composition which has an excellent color value, is stable, and may be prepared in a relatively simple manner.

Briefly, a liquid azo dye composition for coloring petroleum distillates is characterized in that it
(a) Has a color value which is at least about forty percent of the color value of a comparable solid dye;
(b) Exhibits permanently homogeneous liquidity;
(c) Is capable of complete and substantially instantaneous solubility in petroleum distillates; and
(d) Essentially consists of between about 50–75% by weight of a mixture of azo dyes containing $C_5$–$C_{12}$ alkyl-beta-naphthols or p-$C_5$–$C_{12}$ alkyl phenol in the dye molecule and about between 50–25% by weight of a liquid organic viscosity depressant compatible with the azo dyes.

In a preferred embodiment, the azo dyes correspond to the formula $$A\text{—}N\text{=}N\text{—}X$$

wherein X is isomeric heptyl beta-naphthol or p-nonyl phenol and A is an aromatic residue of the benzene or naphthalene series.

The symbol A in the formula may stand for aniline, ring-substituted aniline, naphthalene or ring-substituted naphthalene.

Compounds of the following formulae yield superior liquid dye compositions when admixed with a suitable organic viscosity depressant in the indicated ratio:

Orange dyes

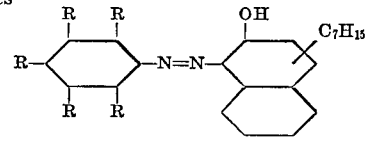

wherein R is hydrogen, methyl, ethyl, propyl, butyl or methoxy;

Red and purple dyes

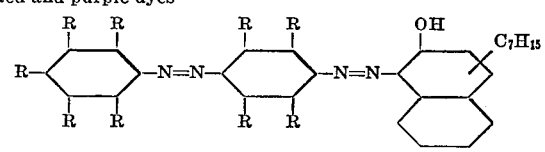

wherein R is hydrogen, methyl, ethyl, propyl, butyl or methoxy;

Orange dye

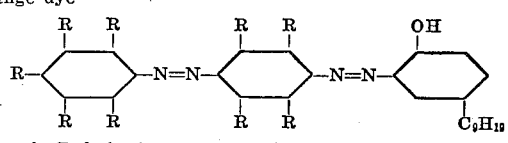

wherein R is hydrogen or methyl;

Yellow dye

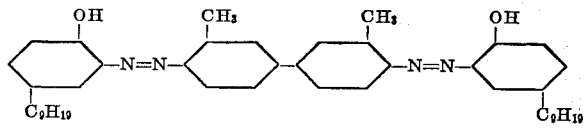

The dye compositions are totally insoluble in water.

The preferred azo dyes of the composition may be obtained by coupling a diazonium compound with a heptyl beta-naphthol intermediary as defined hereinbelow or a p-nonyl phenol.

The diazonium compound may be any suitable diazotized aromatic amine. As is generally known in this art, certain functional groups commonly used as substituents of aromatic amines should be avoided, such as, for example, hydrophilic groups, e.g. sulphonic acid or carboxylic acid groups. Nitro- and hydroxyl groups are also undesired in many instances. Halogen, alkoxy and alkyl groups behave in indifferent manner in most instances and, therefore, can usually be included in the aromatic amine moiety.

The viscosity depressant of the inventive azo dye composition may be an aromatic hydrocarbon, such as benzene, toluene, xylene, or mixtures of aromatic and aliphatic solvents as they are commercially available. The viscosity depressant imparts liquidity to the composition. The choice of the particular viscosity depressant will be dependent on a number of different factors such as the desired viscosity, specific gravity, flash point and the like physical characteristics of the final composition. The particular purpose for which the composition is intended and costs are, of course, other factors to be considered. In most instances, commercial grade xylols are eminently suitable. For some purposes as, for example, in ink manufacture or for the coloring of plastics, aromatic constituents in the final composition are usually undesirable and viscosity depressants such as ethyl acetate or other esters or ketones such as methyl isobutyl ketone may then be used. Resins, varnishes and many alcohols may also be used as viscosity depressants.

At this point, it should be emphasized that the viscosity depressant does not serve the function of a solvent per se, but is a carrier for the azo dye proper in which the azo dye is soluble in practically unlimited quantities. The amount of viscosity depressant in the final composition should be preferably less than the amount of azo dye. The specific proportion of viscosity depressant in the final composition will be determined by consideration of standardization of color value and viscosity rather than as the quantity required to prevent solidification.

The primary feature of the inventive composition is its liquidity under customary conditions of application or storage. The term "liquid" as used herein is deemed to refer to a homogeneous single phase fluid, which flows readily and may be poured, pumped or metered for application purposes. Thus, "liquid" as used herein does not refer to a two phase suspension of finely divided solid dye in a fluid carrier, but the inventive dye composition consists of a clear single phase liquid.

In appreciating the advantages of the inventive liquid dye composition, it should be considered that the prior art azo dyes have a relatively low solubility in solvents. Usually, and as previously mentioned, it is not possible to prepare dye solutions having a dye content in excess of 2% and even at such low concentrations the solutions are not stable. From an economical point of view, the solvents are usually more expensive than the dye proper. The color value of such prior art dye solutions is only about 1 to 2% of the color value of the corresponding dry dye calculated on a weight basis. By contrast, the liquid dye compositions according to the present invention have at least 40% of the color value of solid dyes presently used for petroleum application. Other prior art solid dyes used for ink manufacture and applications in the plastic industry often have even lower color values so that in some cases the liquid dye compositions of this invention have equal or even greater color value than comparable prior art solid dyes.

A liquid dye composition must have certain desirable physical properties in order to be suitable for application as additive to a petroleum product. These properties may be summarized as follows:

(1) The dye composition has to be stable for indefinite periods of time. Thus, solid matter should not separate upon long storage and/or at low temperatures. Further, no portion of the product should readily volatilize, as volatilization would result in change of color value or other physical properties.

(2) The viscosity of the liquid system must be sufficiently low so as to facilitate handling. This means that the flow properties of the liquid should permit incorporation of the liquid system in a petroleum product without previous heating. If the liquid dye composition is to be added to petroleum distillates, the material should be capable of passage through miniature pumps and metering devices capable of injecting minute quantities of the dye composition into a moving stream at controlled rates. From a practical point of view, the dye composition therefore should advantageously have a viscosity at 20° C. which is comparable to that of light crank case oil.

(3) The stability of color value should be comparable to that of solid dyes. Solid dyes are usually extremely stable with regard to color value in dry state, but lose color value at varying rates upon dissolution.

The invention will now be illustrated by a number of examples, it being understood, however, that these examples are given by way of illustration and not by way of limitation, and that many changes and alterations may be effected in quantity, choice of raw material and process conditions in general without affecting in any way the scope and spirit of the invention as recited in the appended claims.

EXAMPLE I

Coupling of heptyl beta-naphthol with diazonium compound

One orange and two different red dyes are prepared. Each dye contains heptyl beta-naphthol as part of the azo dye molecule. The coupling is effected in conventional fashion, although mechanical problems arise due to the physical nature of the dyes so that certain procedural changes with respect to ordinary dye coupling have to be effected. This is particularly true with regard to larger than laboratory batches.

Azo dyes are commonly prepared in aqueous media and are then separated from the coupling suspension, washed free of salts, and dried. The azo dyes prepared in accordance with the present invention are also separated from the coupling suspension and dried in the form of a molten tar. The tar is then admixed with the viscosity depressant in a desired ratio, whereafter the resulting liquid is filtered to remove salts and impurities.

(A) Preparation of orange dye of the formula

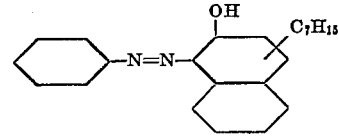

93 grams of aniline are dissolved in 1 liter of water and 267 grams of 20° Be HCl. Ice is added to the solution and diazotization is carried out at 0° C. by the addition of 70 grams of sodium nitrite.

265 grams of heptyl beta-naphthol are dissolved in 2 liters of hot water and 200 grams of 45% potassium hydroxide. The solution thus obtained is then diluted with 3600 ml. of cold water, whereby a clear solution is obtained. Ice is added to the solution and the solution containing the diazonium compound is run in slowly at a temperature of 0 to 10° C. A reddish-orange suspension of soft tar form is obtained while a small portion of the dye is obtained in the form of a fine dispersion due to the surface active nature of the heptyl beta-naphthol potassium salt. At the end of the coupling procedure, a spot test on filter papers shows only a trace of excess heptyl beta-naphthol in solution. It will be noted that the intermediary heptyl-beta-naphthol is dissolved in a potassium hydroxide solution as distinguished from a sodium hydroxide solution as commonly employed in this type of coupling reaction. Potassium hydroxide is preferred as it has been found that the intermediary is more soluble in potassium hydroxide and also more stable therein.

Separation of dye:

Hydrochloric acid is then added to the reaction mixture until the suspension is acid to congo paper, causing considerable dehydration of the soft, dye comprising tar. The mixture thus obtained is then warmed slightly, causing the then liquid tar to dehydrate further and to float on the surface. Agitation is stopped and the dye is removed from the surface and transferred to a flask. The dye is heated under mild vacuum conditions under stirring until dry and a sample is tested for color value. The crude dye is a tar of indefinite low melting point. The tar becomes fluid above approximately 10° C.

A viscosity depressant, in this instance xylol, is added to the tar to obtain a liquid dye composition having a xylol content of approximately 25%, as the liquid is brought to standard color value. The liquid is then filtered and ready for application. Upon storage for several months, no precipitation or sedimentation could be observed.

(B) Two red dyes of the following formula were prepared:

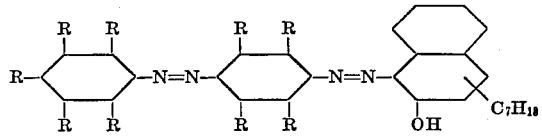

wherein R stands for methyl or hydrogen. The distinction between the two reds is in the number and distribution of the methyl groups in the substituted amino-azo-benzene radical.

A quantity corresponding to 1.0 gram mole of a mixed amino-azo compound consisting of methyl derivatives of amino-azo-benzene is diazotized in the usual fashion at a temperature of 5 to 10° C. with 3.0 moles of hydrochloric acid and 1.0 mole of sodium nitrite. The diazotized solution is clarified and is then run to a coupling solution of 1.0 mole of heptyl beta-naphthol. The heptyl beta-naphthol had previously been dissolved in 310 grams, 45% KOH solution. A red suspension of dispersed solid dye is formed. Following completion of the coupling at 5 to 10° C., the suspension is acidified as in Example I-A and warmed to approximately 20° C. The reaction mixture is then filtered in the form of a dehydrated solid. Alternately, the coupling mixture may be heated to approximately 40° C. which results in floating of the product as a dehydrated viscous tar which may be removed from the surface. The tar becomes fluid above about 40° C. The dye thus obtained is then dried, standardized with a viscosity depressant and filtered as a clear red color.

(C) The procedure of Example I-B is repeated, but as raw material a modified amino-azo-benzene derivative is used as diazonium component.

EXAMPLE II

Ten ounces (weight) of the fluid orange dye composition obtained in accordance with Example I-A are dissolved in 10,000 gallons of regular grade leaded gasoline. A gasoline solution having a color intensity equivalent to that of representative colored gasoline is obtained.

EXAMPLE III

Twelve ounces (weight) of a fluid red composition obtained in accordance with Example I-B are dissolved in 10,000 gallons of a premium grade leaded gasoline to produce a solution of color intensity equivalent to that of a representative present colored gasoline.

EXAMPLE IV

Sixteen ounces (weight) of a fluid red dye composition produced in accordance with Example I-C are dissolved in 1,000 gallons of a typical automatic transmission fluid formulation. A white blotter is placed beneath a suspect automobile transmission. Appearance of red color drops on the blotter indicate a leaking transmission unit.

EXAMPLE V

Preparation of penetrating wood stains

Four parts of a fluid red dye composition produced in accordance with Example I-C are dissolved in 96 parts of an aromatic hydrocarbon solvent, for example, toluene. The solvent contains 5 to 10 parts of a resin, drying oil or varnish. A penetrating oil stain is obtained which may be used for the finishing of wood.

EXAMPLE VI

Preparation of nitro-cellulose transparent lacquer

A solvent mixture is prepared comprising ethyl acetate, amyl acetate, diacetone alcohol and xylol. Two parts of nitrocellulose as ½-second nitro-cellulose solution, 0.5 to 1.0 parts of dioctylphthalate and 1 to 2 parts of maleic alkyd resin are added to 100 parts of the solvent mixture. Two parts of a liquid orange dye composition in accordance with Example I-A are dissolved in the liquid system, forming a colored lacquer which may be applied as a metal or foil coating. This composition is particularly suitable to coat aluminum foil, steel cans, jar lids and the like.

EXAMPLE VII

Preparation of rotogravure ink

Ten parts of liquid orange dye composition produced in accordance with Example I-A are dissolved in a solution of five parts of limed and/or zincated rosin in 100 parts of kerosene.

EXAMPLE VIII

Fifteen parts of liquid red dye composition produced in accordance with Example I-C are dissolved in a solution of 8 parts of chlorinated rubber and one part zincated rosin in 100 parts of xylol, high flash naphtha or a mixture of these solvents. Insoluble pigments may be added to the ink.

EXAMPLE IX

A quantity corresponding to 1.0 gram mole of a mixed amino-azo compound, consisting of methyl derivatives of amino-azo benzene is diazotized in the usual fashion by suspending in 2 liters of water with 2.5 gram moles of hydrochloric acid. Ice is added to maintain a temperature of 5 to 10° C., while 1.0 gram mole sodium nitrite, as a solution, is run in. The solution is clarified. A suspension of 1.0 gram mole para nonyl phenol in 5 liters water and 2.0 gram moles of potassium hydroxide is prepared and cooled to 0° C. The solution of diazotized amino azo compound is run in slowly, with stirring, and the mixture stirred until coupling is complete. The product may be isolated by filtration and washed, or alternately the suspension acidified and heated to approximately 30° C., where it separates as a floating fluid tar, which may be removed from the surface. The dye thus obtained is dried and diluted with an aromatic solvent, such as xylene, for purposes of standardization and lowering of viscosity. The product is filtered producing a homogenous red liquid, which dissolves in organic solvents to produce an orange solution.

EXAMPLE X

The procedure of Example IX is followed, except that 0.5 gram mole of ortho tolidine is used in place of the methyl derivatives of amino azo benzene. The product is a homogenous orange liquid which dissolves in organic solvents to produce a yellow solution.

While specific embodiments of the invention have been shown and described in detail to illustrate the application of the inventive principles, it will be under-

What is claimed is:

1. A colored petroleum distillate having dissolved therein a liquid azo dye composition which
   has a color value which is at least about forty percent of the color value of a comparable solid dye,
   exhibits permanently homogeneous liquidity,
   is capable of complete and substantially instantaneous solubility in petroleum distillates, said liquid azo dye composition consisting essentially of between about 50–75% by weight of a mixture of azo dyes containing $C_5$–$C_{12}$ alkyl beta-naphthols or P–$C_5$–$C_{12}$ alkyl phenol in the dye molecule, said azo dyes having the general formula

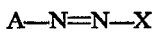

wherein A is an aromatic residue of the benzene or naphthalene series and X is selected from the group consisting of $C_5$–$C_{12}$ alkyl beta naphthols and p–$C_5$–$C_{12}$ alkyl phenols; and about between 50–25% by weight of a liquid organic viscosity depressant compatible with the azo dyes, said viscosity depressant being selected from the group consisting of aromatic hydrocarbons, aliphatic solvents, esters, ketones, and alcohols, the amount of said azo dye composition in said distillate being sufficient to impart said distillate with a distinct color.

2. A colored petroleum distillate as claimed in claim 1, wherein said azo dyes of said azo dye composition correspond to the formula

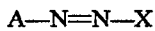

wherein X is isomeric heptyl beta-naphthol or p-nonyl phenol and A is an aromatic residue of the benzene or naphthalene series.

3. A colored petroleum distillate as claimed in claim 2, wherein the azo dyes have the formula

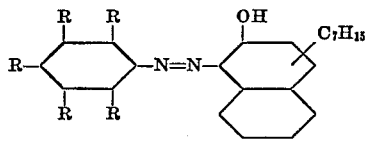

wherein R is hydrogen, methyl, ethyl, propyl, butyl or methoxy;

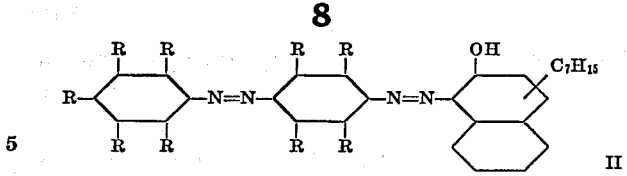

wherein R has the above meaning;

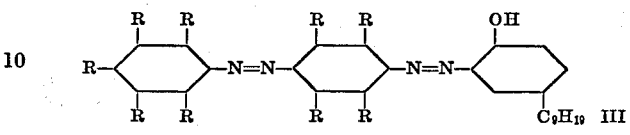

wherein R is hydrogen or methyl; or

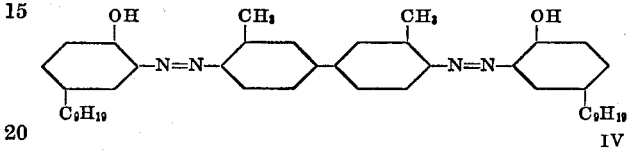

4. A colored petroleum distillate as claimed in claim 1, wherein the organic viscosity depressant is an oleophilic organic solvent.

References Cited

UNITED STATES PATENTS

| | | | |
|---|---|---|---|
| 2,925,333 | 2/1960 | Thompson | 44—59 |
| 3,049,533 | 8/1962 | Spitzer, Jr. et al. | 44—59 |
| 3,073,664 | 1/1963 | Spitzer, Jr. et al. | 44—59 |
| 3,356,443 | 12/1967 | Dziomba | 44—59 |
| 3,534,016 | 10/1970 | Lange | 44—59 |

FOREIGN PATENTS

| | | | |
|---|---|---|---|
| 772,062 | 11/1967 | Canada | 8—3 |

OTHER REFERENCES

Lubs, Chem. of Syn. Dyes & Pigm., p. 174–177, 1955.

DANIEL E. WYMAN, Primary Examiner

Y. H. SMITH, Assistant Examiner

U.S. Cl. X.R.

252—51.5 R